United States Patent
Liu et al.

(10) Patent No.: US 12,397,351 B2
(45) Date of Patent: Aug. 26, 2025

(54) LASER PRINTING DEVICE FOR CREATING 3D PRODUCT AND LASER PRINTING METHOD FOR CREATING 3D PRODUCT

(71) Applicant: GUANGDONG HANBANG 3D TECH CO., LTD., Zhongshan (CN)

(72) Inventors: Jian-Ye Liu, Zhongshan (CN); Wen-Hua Gao, Zhongshan (CN); Wen-Jun Qi, Zhongshan (CN); Ka-Li Xu, Zhongshan (CN); Liu-Hui Niu, Zhongshan (CN); Gao-Feng Hu, Zhongshan (CN); Hao-Wei Zhu, Zhongshan (CN)

(73) Assignee: GUANGDONG HANBANG 3D TECH CO., LTD., Zhongshan (CN)

( * ) Notice: Subject to any disclaimer, the term of this patent is extended or adjusted under 35 U.S.C. 154(b) by 776 days.

(21) Appl. No.: 17/548,780

(22) Filed: Dec. 13, 2021

(65) Prior Publication Data
US 2022/0097144 A1    Mar. 31, 2022

Related U.S. Application Data

(63) Continuation-in-part of application No. PCT/CN2019/096861, filed on Jul. 19, 2019.

(30) Foreign Application Priority Data

Jun. 17, 2019 (CN) .......................... 201910523112.8

(51) Int. Cl.
*B22F 12/45* (2021.01)
*B22F 10/28* (2021.01)
(Continued)

(52) U.S. Cl.
CPC .............. *B22F 12/45* (2021.01); *B22F 10/28* (2021.01); *B22F 10/66* (2021.01); *B22F 12/17* (2021.01);
(Continued)

(58) Field of Classification Search
CPC .......... B22F 12/45; B22F 12/17; B22F 10/66; B22F 12/43; B22F 10/28; B33Y 40/20;
(Continued)

(56) References Cited

U.S. PATENT DOCUMENTS

| 2012/0187103 | A1* | 7/2012 | Hayashi | ............... | B23K 26/082 |
|---|---|---|---|---|---|
| | | | | | 219/383 |
| 2017/0246683 | A1 | 8/2017 | Jones et al. | | |

(Continued)

FOREIGN PATENT DOCUMENTS

| CN | 103418985 | 12/2013 |
|---|---|---|
| CN | 105538728 | 5/2016 |

(Continued)

*Primary Examiner* — Elizabeth M Kerr
*Assistant Examiner* — Simpson A Chen
(74) *Attorney, Agent, or Firm* — ScienBiziP, P.C.

(57) ABSTRACT

A laser printing device for making high-precision 3D products includes a platform, a device supplying and spreading powder for transporting and spreading metal powder on the top surface of the platform, a first laser source for emitting continuous laser beam, a second laser source for emitting pulsed laser beam, an optical path switching device connected with the first laser source and the second laser source for controlling and selecting the first laser source and the second laser source to emit laser beam, a scanning galvanometer system for focusing the laser beam on the platform for making the continuous laser beam melt the metal powder and a layer of a product being formed after cooling, a mechanical processing device for polishing the final surface of the product. The pulsed laser beam cuts the edge of each newly-deposited layer with geometric accuracy. A laser printing method for 3D product is also provided.

2 Claims, 3 Drawing Sheets

(51) Int. Cl.
| | |
|---|---|
| *B22F 10/66* | (2021.01) |
| *B22F 12/17* | (2021.01) |
| *B22F 12/43* | (2021.01) |
| *B23K 26/03* | (2006.01) |
| *B23K 26/0622* | (2014.01) |
| *B23K 26/342* | (2014.01) |
| *B23K 26/362* | (2014.01) |
| *B33Y 10/00* | (2015.01) |
| *B33Y 30/00* | (2015.01) |
| *B33Y 40/20* | (2020.01) |

(52) U.S. Cl.
CPC .............. *B22F 12/43* (2021.01); *B23K 26/03* (2013.01); *B23K 26/0622* (2015.10); *B23K 26/342* (2015.10); *B23K 26/362* (2013.01); *B33Y 10/00* (2014.12); *B33Y 30/00* (2014.12); *B33Y 40/20* (2020.01)

(58) Field of Classification Search
CPC .... B33Y 10/00; B33Y 30/00; B23K 26/0622; B23K 26/342; B23K 26/03; B23K 26/362
USPC ..................................................... 219/121.62
See application file for complete search history.

(56) References Cited

U.S. PATENT DOCUMENTS

| | | | |
|---|---|---|---|
| 2018/0065321 A1* | 3/2018 | Lu | B33Y 50/02 |
| 2018/0093416 A1* | 4/2018 | Prexler | B33Y 10/00 |
| 2018/0178290 A1* | 6/2018 | Urata | B22F 3/24 |
| 2018/0229332 A1* | 8/2018 | Tsai | B23K 26/082 |
| 2019/0001442 A1* | 1/2019 | Unrath | B23K 26/0622 |
| 2019/0022946 A1* | 1/2019 | Jones | B29C 64/393 |
| 2019/0091804 A1* | 3/2019 | Karlen | B29C 64/209 |
| 2020/0108558 A1* | 4/2020 | Vermeulen | B29C 64/264 |
| 2021/0308800 A1* | 10/2021 | Funaoka | B23K 26/382 |

FOREIGN PATENT DOCUMENTS

| | | |
|---|---|---|
| CN | 108015281 A | 5/2018 |
| CN | 109047762 A | 12/2018 |
| EP | 3888819 A1 | 10/2021 |
| WO | WO-2017143789 A1 * | 8/2017 |

\* cited by examiner

LASER PRINTING DEVICE FOR CREATING 3D PRODUCT AND LASER PRINTING METHOD FOR CREATING 3D PRODUCT

FIELD

The disclosure relates to a laser printing device for creating 3D product and a laser printing method for creating 3D product.

BACKGROUND

In SLM (selective laser melting) technology, metal powder is melted and deposited under the heat of a laser beam and then the metal powder is cooled to form products. Although products with high complexity can be formed by SLM technology, there is usually unevenness at the edge of the product due to the spherical shape and spheroidization of metal particles in the forming process, so edges of the product often fail to meet the required geometric accuracy. An allowance of tolerances in machining operations for the product or workpiece must be set in the design stage. The print-created workpiece often needs subsequent machining to meet accuracy requirements. Complex structures such as inner cavities, deep holes, and irregular-shape holes cannot be processed subsequently, and there are inevitable positioning errors when the workpiece is transferred to the machine tool from the SLM printing equipment, which make it difficult for SLM technology to meet requirements in machining accuracy, surface quality, and machining efficiency, and restrict the use of SLM technology in various fields.

A laser printing device for 3D product and a laser printing method for 3D product with improved printing accuracy and surface quality is required, the device must integrate 3D additive printing, precision laser metal cutting, and machining when forming an object. High-precision and high surface quality should be the characteristics of objects which can be used directly, saving subsequent secondary clamping and machining time, and improving the efficiency of 3D printing. The laser printing device for 3D product and a laser printing method for 3D product is an innovative processing method for machining structures, for example deep vertical holes, slender holes, irregular-shaped holes, complex inner cavities and ultra-thin wall structures (50 μm) that are difficult if not impossible to be processed by traditional methods.

SUMMARY

A laser printing device for creating 3D product includes: a platform; a device supplying and spreading powder, configured to transport and spread metal powder on the top surface of the platform; a first laser source, configured to emit continuous laser beam; a second laser source, configured to emit pulsed laser beam; an optical path switching device, connected with the first laser source and the second laser source, and configured to control switches of the first laser source and the second laser source to make the first laser source and the second laser source selectively emit laser beam; a scanning galvanometer system, configured to focus the laser beam on the platform to make the first laser source melt the metal powder on the platform and when the metal powder is cooled as a layer of a product to be formed, make the pulsed laser beam emitted by the second laser source cut the edge of the layer.

Furthermore, the laser printing device for creating 3D product further includes a beam expanding device, the beam expanding device is configured to receive laser beam form the first laser source and the second laser source and adjust the diameter and divergence angle of the laser beam, the scanning galvanometer system focusing the laser beam adjusted by the beam expander on the platform.

Furthermore, the laser printing device for creating 3D product further includes a mechanical processing device, the mechanical processing device is configured to polish the top surface of the layer when the latest surface of the layer belongs to the final surface of the product being formed.

Furthermore, the laser printing device for creating 3D product further includes a lifting and driving device, the lifting and driving device is arranged below the platform and configured to drive the platform downward by a distance equal to the thickness of the layer after cutting the edge of the layer.

Furthermore, the laser printing device for creating 3D product further includes a platform preheating member, the platform preheating member is connected to the lower surface of the platform and is configured to preheat the platform.

A laser printing method for creating 3D product includes: step A: transporting and spreading metal powders on the top surface of a platform; Step B: emitting continuous laser beam to the platform to melt the metal powder on the platform and allowing the metal powder to cool to form a layer of a product to be formed; step C: emitting pulsed laser beam to the platform to cut and trim the edge of the layer.

Furthermore, when emitting the continuous laser beam, the diameter and emission angle of the continuous laser beam are adjustable; and when emitting the pulsed laser beam, the diameter and emission angle of the pulsed laser beam are adjusted as required.

Furthermore, after step C, the laser printing method for creating 3D product further includes: step D: determining whether the latest surface of the layer belongs to the final surface of the product being formed and if so; step E: performing mechanical polishing on such topmost surface of the layer.

Furthermore, after step E, the laser printing method for creating 3D product further includes: determining whether the product is uncompleted or completed; driving the platform downward by a distance equal to the thickness of the layer when the product is determined to be not completed, and repeating the manufacturing processes from step A.

Furthermore, before step A, the laser printing method for creating 3D product further includes: preheating the platform.

The laser printing device for creating 3D product and the laser printing method for creating 3D product form layers in the product forming process by continuous laser beam processing, and the edge of each newly-deposited layer is cut by pulsed laser beam, so as to improve the accuracy of the edges of the formed product. Further, the top surface of the formed product is machined by the mechanical processing device, so as to realize omni-directional finishing of parts.

LABEL OF COMPONENTS

| laser printing device for 3D product | 100 |
|---|---|
| forming chamber | 20 |
| platform | 30 |
| lifting and driving device | 40 |
| device supplying and spreading | 50 |
| platform preheating member | 60 |
| detection and determination device | 24 |
| scanning galvanometer system | 70 |
| beam expanding device | 80 |
| optical path switching device | 90 |
| first laser source | 92 |
| second laser source | 94 |
| mechanical processing device | 96 |
| opening | 22 |
| laser printing method for 3D | Steps S212-S224 |

DETAILED DESCRIPTION

The disclosure will be further described in detail below in combination with the accompanying drawings.

Figure 1:
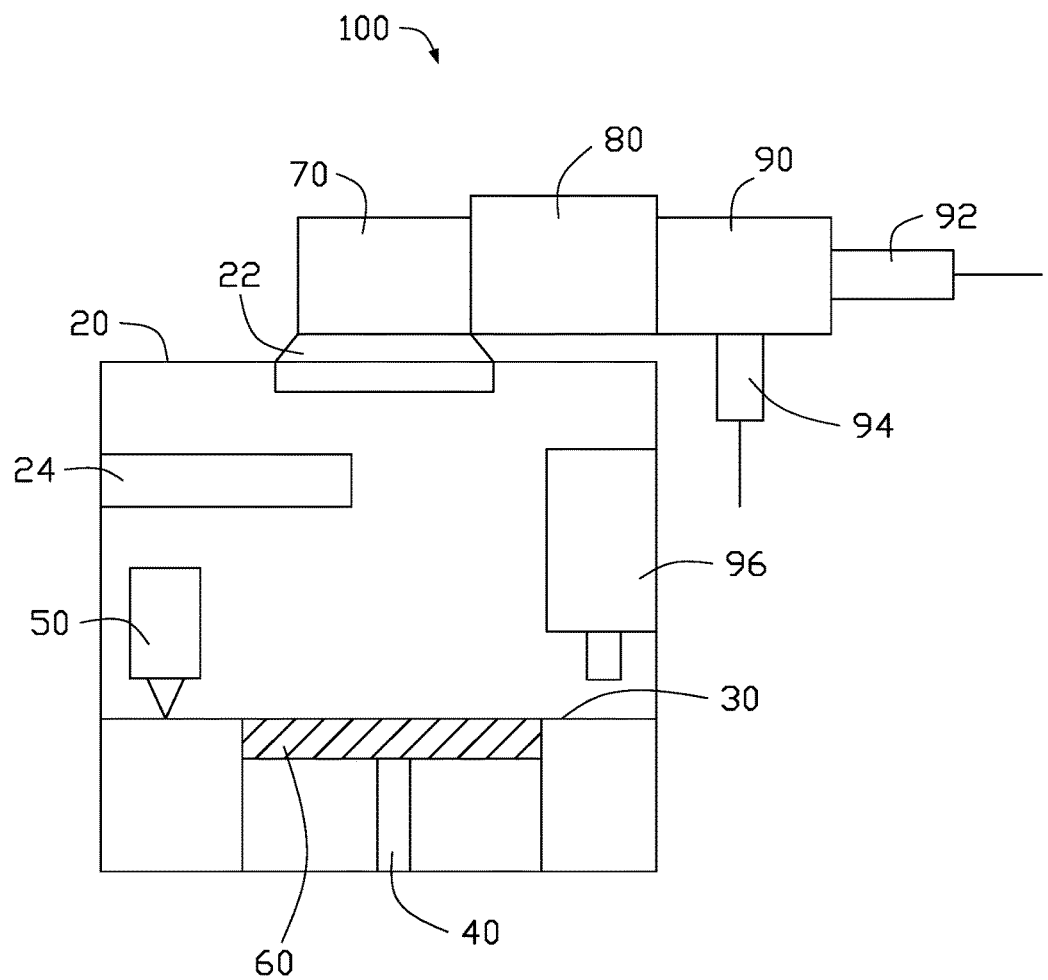
FIG. 1 is a schematic diagram of a laser printing device for making high-precision 3D product.

Referring to FIG. 1, a laser printing device for 3D product 100 is provided. The laser printing device for 3D product 100 is used for forming products. The laser printing device for 3D product 100 includes a forming chamber 20, a platform 30, a lifting and driving device 40, a device supplying and spreading powder 50, a platform preheating member 60, a detection and determination device 24, a scanning galvanometer system 70, a beam expanding device 80, an optical path switching device 90, a first laser source 92, a second laser source 94 and a mechanical processing device 96. The platform 30, the lifting and driving device 40, the device supplying and spreading powder 50, the platform preheating member 60, the detection and determination device 24 and the mechanical processing device 96 are placed in the forming chamber 20.

The device supplying and spreading powder 50 is arranged above the platform 30 for transporting and spreading the metal powder on the top surface of the platform 30.

The first laser source 92 emits a continuous laser beam. The first laser source 92 includes a single or a plurality of lasers. When the first laser source 92 includes a plurality of lasers, the printing efficiency is improved. The second laser source 94 emits a laser beam which is pulsed. The pulsed laser beam can be a short pulsed laser beam or an ultrafast pulsed laser beam, the pulsing can be in nanoseconds, picoseconds, and femtoseconds.

The optical path switching device 90 is connected with the first laser source 92 and the second laser source 94 to control the switches of the first laser source 92 and the second laser source 94, so that the first laser source 92 and the second laser source 94 emit selected laser beam.

The beam expanding device 80 is connected with the optical path switching device 90 to adjust the diameter and divergence angle of the laser beam, so that when the laser beam processes the product, the size of the light spot formed by the laser beam is as required.

The top of the forming chamber 20 defines an opening 22, and the scanning galvanometer system 70 is opposite to the opening 22. The scanning galvanometer system 70 is used to focus the laser beam adjusted by the beam expander 80 on the platform 30 to make the continuous laser beam emitted by the first laser source 92 melt the metal powder on the platform 30 and then the metal powder is allowed to cool to form a layer of the product. The pulsed laser beam emitted by the second laser source 94 cuts the edge of the layer. During cutting, the edge of the layer reaches the required degree of accuracy by adjusting the pulse width, frequency, amount cut, and number of passes (cutting times) of the pulsed laser beam. The edge of the layer is cut clean by the second laser source 94, excess metal on the edge of the layer is removed, the geometric accuracy of the edge of the layer is improved, meeting production demands.

The scanning galvanometer system 70 includes F-θ Lens and one or more scanning galvanometers. The scanning galvanometer is used to adjust the path of the laser beam to align the laser beam with the platform 30. The F-θ lens is used to focus the laser beam on the platform 30.

The detection and determination device 24 is used to detect the geometric accuracy of the edge of the layer processed by the first laser source 92. During cutting, the scanning galvanometer system 70 adjusts the pulse width, frequency, amount cut, and cutting times of the pulsed laser beam emitted by the second laser source 94 according to the detected geometric accuracy of the edge of the layer to make the edge of the layer meet the required accuracy. The detection and determination device 24 is also used to determine whether the latest surface of the layer belongs to the outside surface of the product to be formed.

The mechanical processing device 96 is placed above the machining platform 30 and can be moved above the machining platform 30 for machining the latest surface of the layer when the latest surface of the layer belongs to the outside surface of the product to be formed. The mechanical processing device 96 can be used for milling, planing, grinding, etc. When the product includes a plurality of continuous steps, the mechanical processing device 96 performs mechanical polishing on the final surface of each step, that is, the step surface, but does not perform mechanical polishing on other surfaces of the step. In this way, the mechanical polishing of the final surface of the product improves the smoothness of the top surface of the product.

The platform preheating member 60 is connected to the lower surface of the platform 30 for preheating the platform 30. In this way, stress and deformation of the product are avoided or greatly reduced during laser forming of the layer and mechanical polishing on the layer. In the embodiment, the preheating temperature does not exceed 1000 degrees Celsius.

The lifting and driving device 40 is arranged below the platform 30, which is used to drive the platform 30 to move downward away from the scanning galvanometer system 70 after cutting the edge of the layer, so as to make the platform 30 move downward a distance equal to the thickness of the layer. In the embodiment, the thickness of each layer is about 20-80 microns. The lifting and driving device 40 can be a linear motor module, a servo linear driving module, etc.

When the platform 30 move downward a distance equal to the thickness of the layer, the device supplying and spreading powder 50 again transports and spreads further metal powder on the top surface of the platform 30, that is, on the top surface of the layer, so a plurality of layers is formed in making the product.

Figure 2:
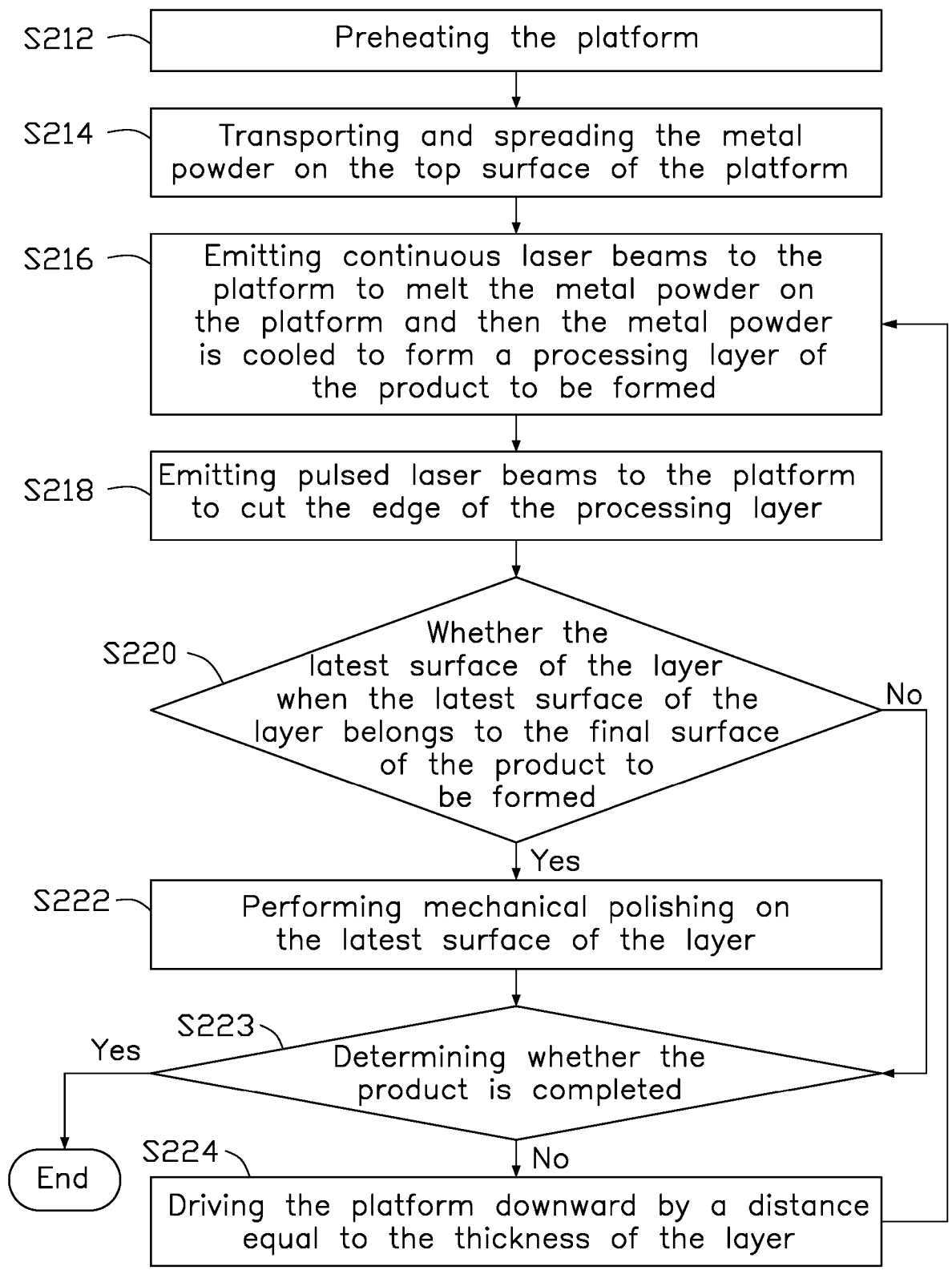
FIG. 2 is a flowchart of a laser printing method for making 3D product in an embodiment.

Referring to FIG. 2, the disclosure provides a flowchart of a laser printing method for 3D product, the laser printing method for 3D product includes the following steps.

Step S212: preheating the platform 30.

Step S214: transporting and spreading the metal powder on the top surface of the platform 30.

Step S216: emitting continuous laser beam to the platform 30 to melt the metal powder on the platform 30 and then the metal powder is cooled to form a layer of the product to be formed.

When emitting the continuous laser beam, the diameter and emission angle of the continuous laser beam are also adjustable to make the spot size formed by the laser beam meet the requirements when processing the product.

Step S218: emitting laser beam which is pulsed to the platform 30 to cut and trim the edge of the layer.

When emitting the pulsed laser beam, the diameter and emission angle of the pulsed laser beam are also adjustable to make the spot size formed by the laser beam meet the requirements when processing the product.

Step S220: determining whether the latest surface of the layer when the latest surface of the layer belongs to the final surface of the product to be formed. If the latest surface of the layer belongs to the final surface of the product to be formed, the procedure goes to step S222, otherwise the procedure goes to step S223.

Step S222: performing mechanical polishing on the latest surface of the layer.

Step S223: determining whether the product is completed. If the product is not completed, the procedure goes to step S224. If the product is completed, the procedure ends.

Step S224: driving the platform 30 downward by a distance equal to the thickness of the layer, and then the procedure goes to step S214.

Figure 3:
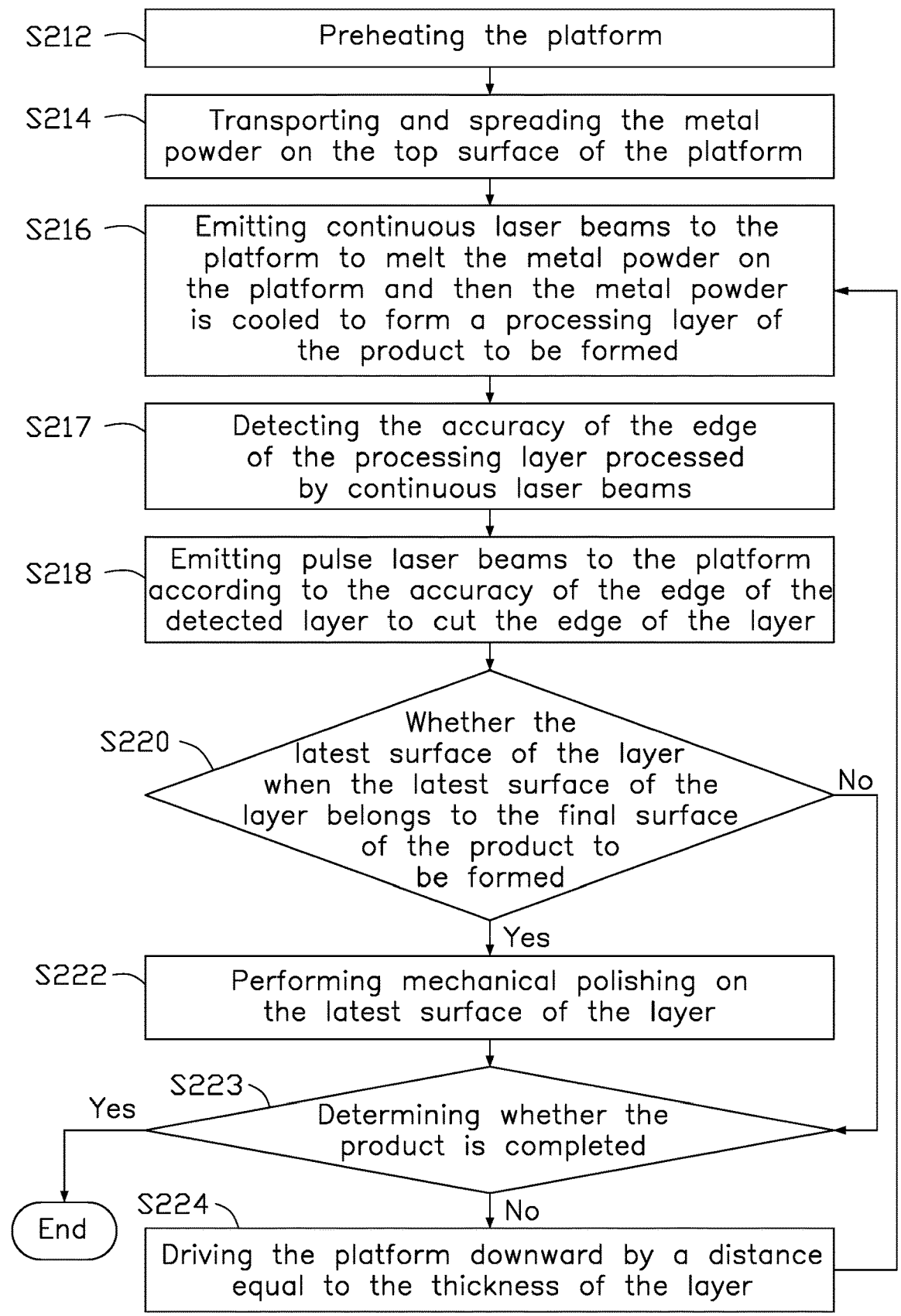
FIG. 3 is a flowchart of a laser printing method for making 3D product in another embodiment.

Referring to FIG. 3, in another embodiment, the laser printing method for 3D product further includes step S217 before step S218. Step S217: detecting the geometric accuracy of the edge of the layer processed by continuous laser beam, and in step S218 emitting pulsed laser beam to the platform 30 according to the geometric accuracy of the edge of the detected layer to cut the edge of the layer.

The laser printing device for 3D product 100 and the laser printing method for 3D product form the layer in the product forming process by continuous laser beam processing, and the edge of the layer is cut by pulsed laser beam, so as to improve the geometric accuracy of the edge of the formed product. Further, the top surface of the formed product is machined by the mechanical processing device 96, so as to realize the omni-directional finishing of parts. The laser forming method of the disclosure can meet the accuracy requirements of mechanical parts, and can realize the direct processing of fine inner cavity structure, and can directly process a hole structure with a ratio of hole depth to hole diameter being ten million times. The hole structure can be vertical hole, slender hole, special-shaped hole, and can directly process a conical hole with an included angle of less than or equal to 30° with the vertical line. The ultra-thin structure can be processed, and the thickness of the narrowest wall of a workpiece can be less than 50 µm. The surface roughness Ra of the printed workpiece can be smaller than 1.6 µm. It can process hole structure with a ratio of hole depth to hole diameter being ten million times.

The above content is only a preferred embodiment of the disclosure. For ordinary technicians in the art, the changes are obtained based on the exemplary embodiment and applying scope according to the idea of the disclosure, the content of the specification should not be understood as a limitation of the disclosure.

What is claimed is:

1. A laser printing device adapted for three dimensional (3D) product, comprising:
   a platform;
   a powder supplying and spreading component, transporting and spreading a metal powder on a top surface of the platform;
   a first laser source emitting continuous laser beams;
   a second laser source emitting pulsed laser beams;
   an optical path switcher connected with each of the first laser source and the second laser source, and controlling switches of the first laser source and the second laser source to make the first laser source and the second laser source selectively emit laser beams;
   a scanning galvanometer system focusing the continuous laser beams and the pulsed laser beams on the platform, wherein the continuous laser beams emitted by the first laser source melt the metal powder on the platform, then the metal powder is cooled to form a layer of a product, and the pulsed laser beams emitted by the second laser source cut an edge of the layer;
   a mechanical processor polishing a topmost surface of the layer when the topmost surface of the layer belongs to a final surface of the product; and
   a detector determining whether a latest surface of the layer belongs to an outside surface of the product to be formed;
   wherein the laser printing device further comprises a forming chamber, the detector and the mechanical processor are placed in the forming chamber, the mechanical processor is placed above the platform and can be moved above the platform for machining the latest surface of the layer when the latest surface of the layer belongs to the outside surface of the product to be formed;
   wherein the detector further detects the geometric accuracy of the edge of the layer processed by the first laser source; the scanning galvanometer system adjusts the pulse width, frequency, cutting amount and cutting times of the pulse laser beams emitted by the second laser source according to the detected geometric accuracy of the edge of the layer and required geometric accuracy of the edge of the layer to make the edge of the layer meet the required accuracy.

2. A laser printing method of manufacturing three dimensional (3D) product comprising:
   step A: transporting and spreading metal powders on a top surface of a platform;
   step B: emitting and focusing continuous laser beams onto the platform to melt the metal powder on the platform and cooling the metal powder to form a layer of a product;
   step C: emitting and focusing laser beams which are pulsed to the platform to cut and trim an edge of the layer;
   step D: determining whether a topmost surface of the layer belongs to a final surface of the product by a detector placed in a forming chamber; and
   step E: performing mechanical polishing on the topmost surface of the layer in the forming chamber if the topmost surface of the layer belongs to the final surface of the product;
   wherein the laser printing method further comprises:
   detecting the geometric accuracy of the edge of the layer processed by the continuous laser beams;
   adjusting the pulse width, frequency, cutting amount and cutting times of the pulse laser beams according to the detected geometric accuracy of the edge of the layer and required geometric accuracy of the edge of the layer.

* * * * *